H. K. & T. W. PORTER.
Vises.
No. 5,653. Reissued Nov. 11, 1873.
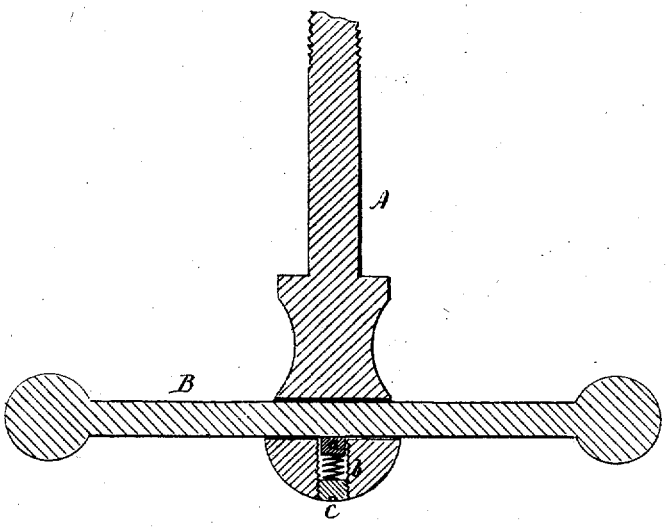
Witnesses
J. H. Shumway
A. J. Tibbits
Chas. Parker
assignee of
H. K. & T. W. Porter
Inventors
By atty.
Wm. E. Earle
AM. PHOTO-LITHOGRAPHIC CO. N.Y. (OSBORNE'S PROCESS)

UNITED STATES PATENT OFFICE.

H. K. PORTER AND T. W. PORTER, OF BOSTON, MASS., ASSIGNORS, BY MESNE ASSIGNMENTS, TO CHARLES PARKER, OF MERIDEN, CONN.

IMPROVEMENT IN VISES.

Specification forming part of Letters Patent No. 72,327, dated December 17, 1867; reissue No. 5,653, dated November 11, 1873; application filed June 19, 1873.

*To all whom it may concern:*

Be it known that H. K. PORTER and T. W. PORTER, of Boston, in the county of Suffolk and State of Massachusetts, have invented a new Improvement in Vises; and I do hereby declare the following, when taken in connection with the accompanying drawings and the letters of reference marked thereon, to be a full, clear, and exact description of the same, and which said drawings constitute part of this specification.

The figure is a sectional view of the same.

In the screw-heads of vises the handle or lever by which they are turned is almost universally, in practice, free to slide in the hole made through such head, in order that the operative length and force of the lever may be changed at will; but when thus free, unless it hangs in a true vertical line or lies in a true horizontal line, the force of gravitation tends to vary its position after the vise has been tightened, and so loosen or tighten its hold upon the article griped in the jaws of the vise. If this pressure be gentle, as is often required, the lever, by loosening the screw, releases the article held. The sudden dropping of the lever when the workman has tightened or loosened the vise and has not quickly removed his hand is the cause of much annoyance and pain, as well as delay in the work, by reason of the very common accident of catching or pinching the fingers between the screw-head and the knob of the falling lever, causing contusions and what are known as "blood-blisters." For the rapid adjustment of the vise it is also very desirable that the lever may project equally on both sides of the screw and held in such position, or any other position in the head, as long as may be convenient. It is also desirable that the amount of pressure on the lever which serves to accomplish these last-mentioned purposes, as well as to avoid the disadvantages and inconveniences previously stated, should be such as to be adjustable and always under control, and that the devices for effecting this should be such as may serve to meet and compensate for the wear upon that surface which comes in contact with this frequently-shifted lever.

To effect these results and avoid these difficulties, which constantly beset the workman, is the object of this invention, which consists in holding the levers in any desired position in the screw-head by means of adjustable and controllable pressure, and also in a certain specific combination of devices to effect this purpose.

In the drawings, A represents the vise-screw, and B the lever by which the screw is actuated. From the end of the screw-head through to the hole for the reception of the lever a small hole is bored in the axis of the screw. In this hole is inserted a plunger, *a*, a spiral metallic spring, *b*, which bears against the plunger, and then a set-screw, *c*, is inserted, the hole being cut with a female screw for that purpose; and by actuating the set-screw any desired degree of pressure may be exerted upon the lever B.

I claim as the invention of the said H. K. PORTER and T. W. PORTER—

In combination with the lever B, passing through the head of the screw A, the adjusting-screw *c*, for the purpose of adjusting the pressure upon the said lever, substantially as described.

CHAS. PARKER,
*Assignee of H. K. and T. W. Porter.*

Witnesses:
CHAS. L. TAYLOR,
JOSEPH H. BECKETT.